(12) United States Patent
Goers et al.

(10) Patent No.: US 6,806,591 B2
(45) Date of Patent: Oct. 19, 2004

(54) METHOD OF SHUTTING DOWN A PLUGGABLE ELECTRICAL UNIT

(75) Inventors: Andreas Goers, Plattensen (DE); Helmut Michel, Hannover (DE); Reiner Bleil, Peine (DE)

(73) Assignee: ABB Patent GmbH, Mannheim (DE)

( * ) Notice: Subject to any disclaimer, the term of this patent is extended or adjusted under 35 U.S.C. 154(b) by 229 days.

(21) Appl. No.: 10/000,317

(22) Filed: Oct. 23, 2001

(65) Prior Publication Data

US 2002/0093416 A1 Jul. 18, 2002

(30) Foreign Application Priority Data

Oct. 24, 2000 (DE) .......................................... 100 52 621

(51) Int. Cl.[7] .............................................. H01H 1/00
(52) U.S. Cl. ..................................... 307/134; 710/302
(58) Field of Search ........................... 307/134; 710/302

(56) References Cited

U.S. PATENT DOCUMENTS 5,822,547 A * 10/1998 Boesch et al. .............. 710/302
6,026,458 A * 2/2000 Rasums ...................... 710/302
6,661,236 B2 * 12/2003 Goers et al. ................ 324/537

* cited by examiner

Primary Examiner—Robert DeBeradinis
(74) Attorney, Agent, or Firm—Michael M. Rickin, Esq.

(57) ABSTRACT

A method of shutting down a pluggable electrical unit in a modular system comprising a base unit and at least one pluggable electrical unit connected via an interface. Each pluggable electrical unit has module electronics and a switch, which is coupled to a mechanical locking of the pluggable electrical unit in the base unit. The electronics is provided with a variable resistor, arranged in a feed line and is communicatively connected to the base unit via switching means. For removal, the pluggable electrical unit to be removed is unlocked and the switch is actuated. Then, communication operations in progress between the base unit and the pluggable electrical unit to be removed are terminated. The communication connection routed via the switching means is disconnected and the module electronics of the pluggable electrical unit to be removed are isolated from the base unit.

1 Claim, 2 Drawing Sheets

METHOD OF SHUTTING DOWN A PLUGGABLE ELECTRICAL UNIT

FIELD OF THE INVENTION

The invention relates to a method of shutting down a pluggable electrical unit in a modular system.

DESCRIPTION OF THE PRIOR ART

Complex electrical engineering systems, in particular in measuring and control technology and in telecommunications, are often of a modular construction. This involves a large number of electrical units being accommodated in an enclosure of an electrical base unit in a pluggable manner. The pluggable electrical units are mechanically of an identical construction but electrically different according to their intended function.

The unprepared removal of one of the pluggable electrical units from a complex system of this type while operation is in progress gives rise to the risk of disruption to the units remaining in operation, as a consequence of the uncontrolled interruption of communication operations which are in progress, since one of the communication parties suddenly and unexpectedly no longer responds.

EP 373 773 discloses a method of removing a plug-in card in which the plug-in card is put into a state of reduced power consumption before its physical removal from the system by applying a predetermined clock signal.

EP 548 382 discloses a method of accomplishing assembly exchange operations while a bus system is in operation, in which system a slot control unit is informed of the imminent assembly exchange operations via a console and the bus system or via a serial interface. The entire bus system is switched by means of the slot control unit into a state in which it is free of bus accesses. It is disadvantageous that the bus traffic is interrupted for all the assemblies during the entire time of the assembly exchange operations.

The known methods share the feature that an imminent removal of an assembly has to be reported manually and separately to the system by an operator and it is subsequently necessary to wait until the system signals readiness for the removal of the assembly.

The invention is therefore based on the object of specifying a method of shutting down a pluggable electrical unit in a modular system which manages without a separate announcement of the imminent removal and avoids interruption of the bus traffic for units remaining in the system.

SUMMARY OF THE INVENTION

The invention is based on a modular system comprising a base unit and at least one pluggable electrical unit, each pluggable electrical unit having at least one set of module electronics and a switch, which is coupled to a mechanical locking of the pluggable electrical unit in the base unit. The interface between the base unit and the pluggable electrical unit is provided with a variable resistor, arranged in the feed line, and switching means, via which the module electronics are communicatively connected to the base unit.

The essence of the invention is that the obligatory actuation of the switch in the pluggable electrical unit to be removed initiates a process in which the power supply is switched off only for the pluggable electrical unit to be removed, and the communicative connection between the pluggable electrical unit to be removed and the base unit is interrupted.

Because of the mechanical unlocking which has to precede the physical removal of the pluggable electrical unit and the associated obligatory actuation of the switch, it is possible to dispense with separate reporting of the imminent removal of the pluggable electrical unit.

When a pluggable electrical unit is removed, a handling time in the range of several seconds from the actuation of the switching contact to the actual disconnection of the contacts of the plug-in contact device elapses. Given a minimal time which the modular system requires to take into account the imminent removal, of the order of magnitude of a few hundred milliseconds, the system is reliably able to have taken all the required precautions before the corresponding pluggable electrical unit has been physically removed from the system.

This involves terminating communication operations which are in progress and subsequently interrupting the communicative connection between the pluggable electrical unit to be removed and the base unit via the switching means. The communication connections between all the units remaining in the system are in this case continuously maintained. This avoids disruptions in the system.

DESCRIPTION OF THE DRAWINGS

Further details and advantages of the invention are explained in more detail below on the basis of an exemplary embodiment. In the drawings required for this purpose.

DESCRIPTION OF THE PREFERRED EMBODIMENT(S)

Figure 1:
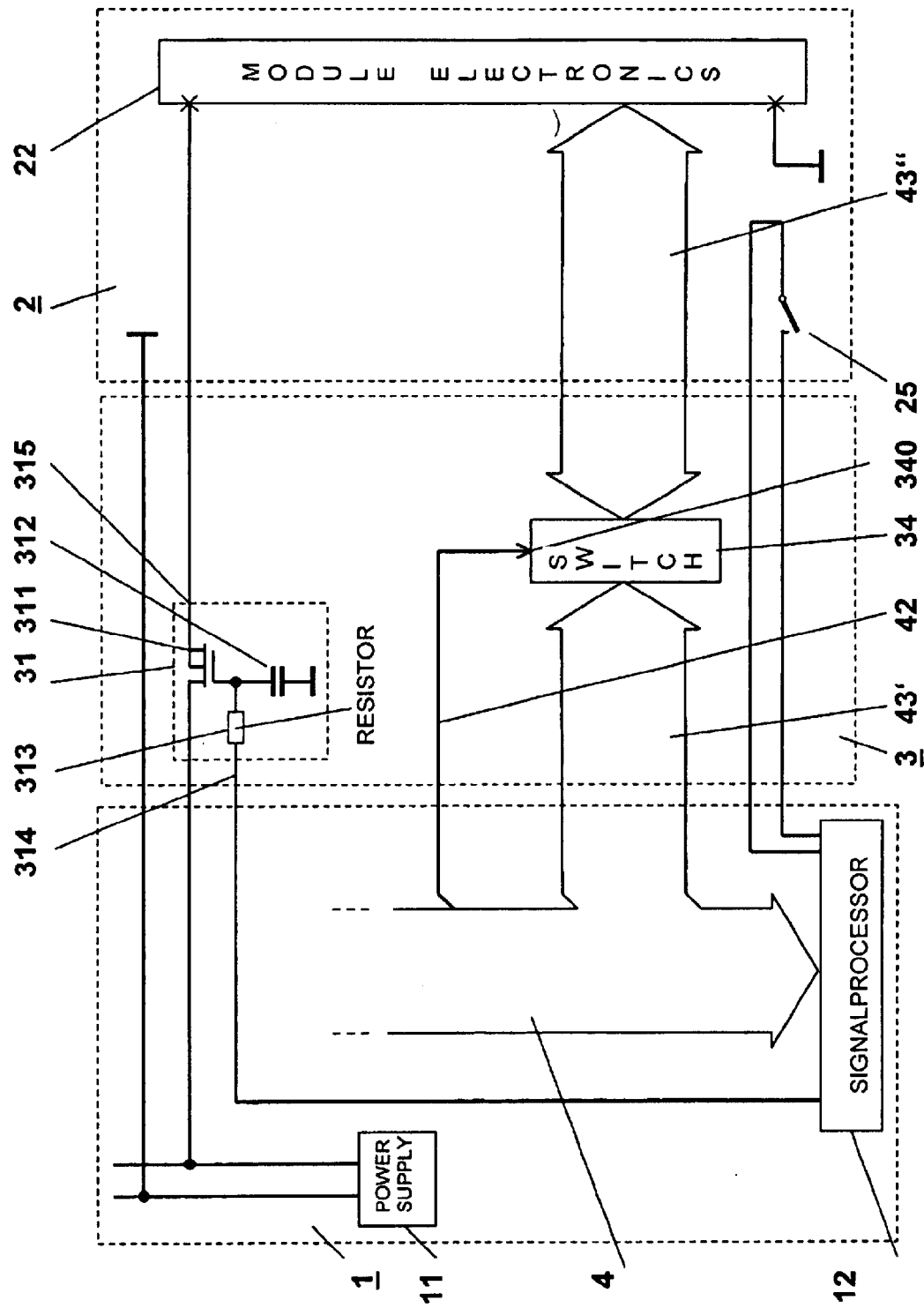
FIG. 1 shows a basic representation of a modular system

FIG. 1 shows a base unit 1 with a signal processing means 12 and a power supply device 11 for feeding the signal processing means 12 and all connectable pluggable electrical units 2.

The signal processing means 12 of the base unit 1 comprises a microcontroller circuit with a plurality of input/output terminals, which can be configured as address terminals, as data terminals and as control terminals. Microcontrollers of this type are known per se. For example, the type 80C517 is equipped with 56 digital input/output terminals, which are grouped together in seven bidirectional 8-bit ports. Each of these 56 port terminals can itself be configured as desired as an input or output terminal. By alternately successive configuration as an input terminal and output terminal, each port terminal can be set as a bidirectional terminal for successive reading and writing. In addition, the microcontroller has control-signal terminals of a predetermined and unalterable logical signal assignment and direction of signal transmission.

Connected to the signal processing means 12 of the base unit 1 is the backplane wiring bus 4, which comprises a control line 42 and signal lines of a module bus 43'. The backplane wiring bus 4 is routed to each slot for receiving a pluggable electrical unit 2.

In addition, a pluggable electrical unit 2 is represented by way of example in FIG. 1, only the means necessary for explanation of the invention being shown. The functionality of the pluggable electrical unit 2 is accommodated in the module electronics 22.

Arranged between the base unit 1 and the pluggable electrical unit 2 is an interface device 3. The interface device 3 may be configured as part of the base unit 1, part of the pluggable electrical unit 2 or as a separate plug-in unit. The interface device 3 is equipped with a variable resistor 31, which is arranged in the feed line for the power supply of the pluggable electrical unit 2 from the base unit 1. The variable resistor 31 comprises an enhancement-mode n-channel MOSFET 311 (Metal-Oxide-Silicon Field-Effect Transistor), the source-drain path of which is connected into the current path of the feed line and the gate terminal of which is connected via a timing element to a control input 314. The timing element comprises a resistor 313, which is connected between the control input 314 and the gate terminal of the MOSFET 311, and a capacitor 312, which is connected between the gate terminal of the MOSFET 311 and frame potential.

The drain terminal of the MOSFET 311 is connected to the power supply device 11. The source terminal of the MOSFET 311 is the controlled terminal 315 of the variable resistor 31.

As long as the control input 314 is voltage-free with respect to frame potential, the source-drain path of the MOSFET 311 is at high resistance. As soon as a positive voltage with respect to frame potential 24 is applied to the control input 314, the voltage across the capacitor 312, and consequently the gate-source voltage of the MOSFET 311, slowly increases. As a result, the source-drain path of the MOSFET 311 becomes lower in its resistance and the voltage at the controlled terminal 315 increases in a ramp-shaped manner.

Furthermore, the interface device 3 is equipped with a switching means 34, which is configured as a bus switch arrangement and which has a control input 340 and a plurality of pairs of terminals, not designated any more precisely, the terminals of each pair of terminals being disconnected from each other at high resistance or connected to each other at low resistance in dependence on the logical signal level at the control input 340. A control line 42 for the actuation of the bus switch arrangement 34 is connected to the control input 340.

Bus switches of this type are known per se and commercially available in various configurations. For example, the type QS3384 of the company Integrated Device Technology (IDT) has ten pairs of terminals for connecting and disconnecting signal lines, five pairs of terminals in each case being assigned a common control input. Each pair of terminals is connected to each other by an electronic switch, the resistance of which in the closed state is typically 5 ohms. The electronic switches are designed for bidirectional signal flow.

The bus switch arrangement 34 is intended for the isolation of the module bus 43', 43". Here and below, single-primed reference numerals 43' stand for non-isolated lines, which are branched off from the backplane wiring bus 4, and double-primed reference numerals 43" stand for isolated lines, which are arranged between the bus switch arrangement 34 and module electronics 22 of the pluggable electrical units 2.

Finally, the pluggable electrical unit 2 has a switch 25, the terminals of which are connected to the signal processing means 12 of the base unit 1. The switching contact of the switch 25 is open in the rest position and closed in the fully inserted state of the pluggable electrical unit 2. The switch 25 is coupled to means for locking the pluggable electrical unit 2 in the base unit 1.

Figure 2:
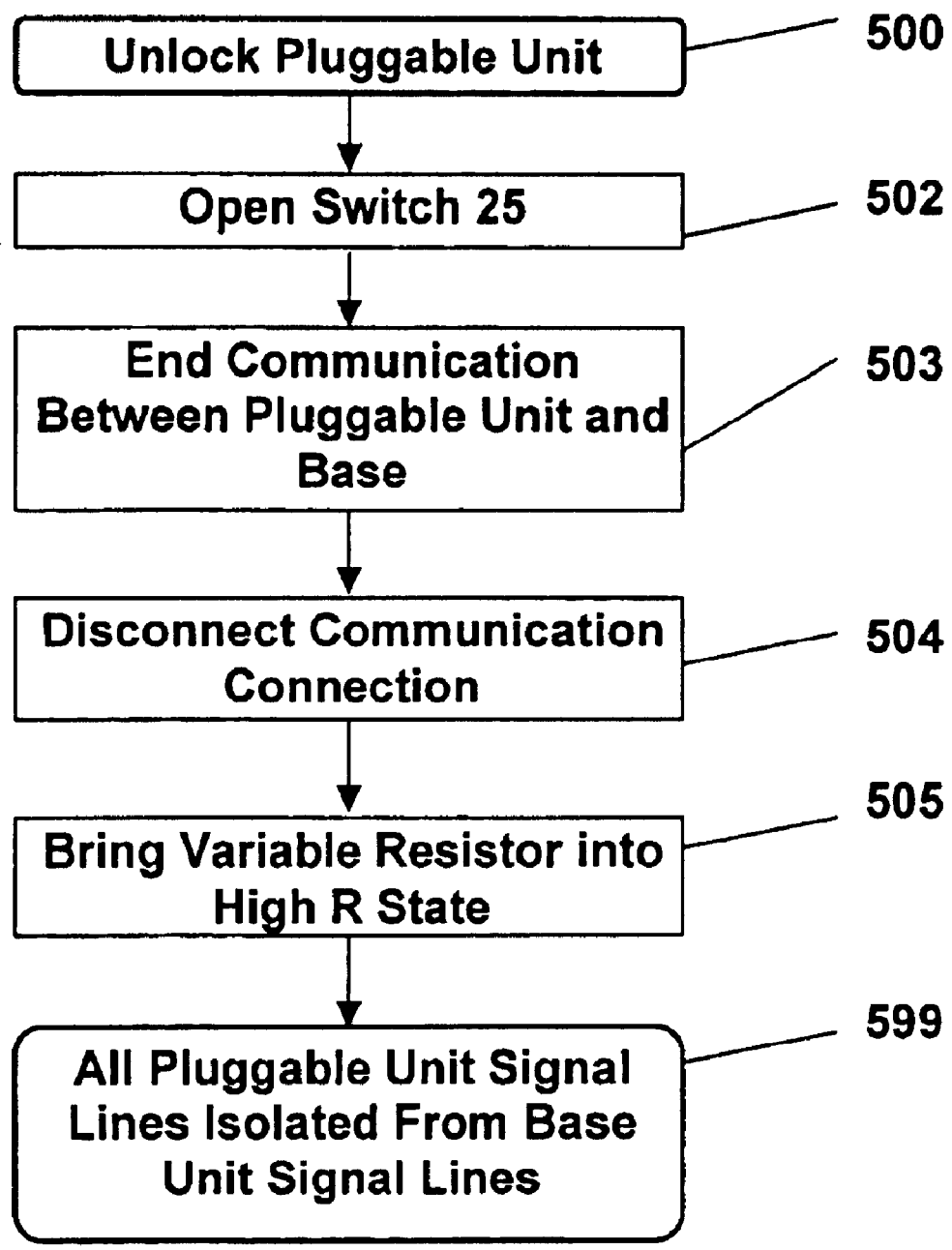
FIG. 2 shows a representation of the steps according to the method in a program flowchart

In the following text, the sequence of steps for shutting down the pluggable electrical unit 2 in the modular system is explained on the basis of a flowchart with reference to FIG. 2 while reverting to the means shown in FIG. 1. A pluggable electrical unit 2 which is in operation is taken as a basis here.

The variable resistor 31 is in its low-resistance state. The pluggable electrical unit 2 is locked in the base unit 1. The switching contact of the switch 25 is closed. The bus switch arrangement 34 is active. The isolated lines of the module bus 43" are connected to the non-isolated lines of the module bus 43'. Data are exchanged between the pluggable electrical unit 2 and the base unit 1 via the module bus 43' and 43" and the backplane wiring bus 4.

For shutting down, the locking of the pluggable electrical unit 2 is unlocked in step 500. In the course of the unlocking, the switching contact of the switch 25 is opened in step 502. The opening of the switching contact is detected by the signal processing means 12 of the base unit 1.

Then, in step 503, the communication operations in progress between the base unit 1 and the pluggable electrical unit 2 to be removed are terminated.

Once the communication operations have been terminated, the communication connection routed via the bus switch arrangement 34 is disconnected, in step 504. This involves deactivating the bus switch arrangement 34 and disconnecting the connection between the isolated lines of the module bus 43" and the associated non-isolated lines of the module bus 43'. As a result, the module electronics 22 of the pluggable electrical unit 2 to be removed are isolated from the base unit 1.

Finally, in step 505, the variable resistor 31 is brought in a controlled manner into its high-resistance state. For this purpose, the positive potential to the control input 314 of the variable resistor 31 is switched off. As a result of this, the variable resistor 31 goes over into its high-resistance state in a ramp-shaped manner and the switching means of the pluggable electrical unit 2 are disconnected from the power supply.

In step 599, all the signal lines of the pluggable electrical unit 2 are isolated from the signal lines of the base unit 1 and the sequence is ended. The pluggable electrical unit 2 is passive in the modular system and can be physically removed from the system without any retroactive effects.

It is to be understood that the description of the preferred embodiment(s) is (are) intended to be only illustrative, rather than exhaustive, of the present invention. Those of ordinary skill will be able to make certain additions, deletions, and/or modifications to the embodiment(s) of the disclosed subject matter without departing from the spirit of the invention or its scope, as defined by the appended claims.

What is claimed is:

1. In a modular system comprising a base unit and one or more pluggable electrical units inserted and locked in said base unit, said base unit supplying electrical power to each of said one or more pluggable units inserted and locked in said base unit, a method of shutting down each of said one or more inserted and locked pluggable electrical units comprising:

unlocking said each of said one or more inserted and locked pluggable units to be unplugged from said base unit;

actuating during said unlocking a switch located on each of said pluggable units for each of said one or more inserted and locked pluggable units to be unplugged;

terminating communication operations in progress between said base unit and said one or more inserted and locked pluggable units to be unplugged; and terminating electrical power supplied from said base unit to each of said inserted and locked pluggable units to be unplugged.

* * * * *